United States Patent
Curran et al.

(10) Patent No.: US 10,351,966 B2
(45) Date of Patent: Jul. 16, 2019

(54) PROCESS FOR CLEANING ANODIC OXIDE PORE STRUCTURES

(71) Applicant: Apple Inc., Cupertino, CA (US)

(72) Inventors: James A. Curran, Morgan Hill, CA (US); William D. Burke, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 136 days.

(21) Appl. No.: 15/054,004

(22) Filed: Feb. 25, 2016

(65) Prior Publication Data

US 2017/0088967 A1 Mar. 30, 2017

Related U.S. Application Data (60) Provisional application No. 62/233,037, filed on Sep. 25, 2015.

(51) Int. Cl.
| | |
|---|---|
| *C25D 11/20* | (2006.01) |
| *C25D 11/24* | (2006.01) |
| *C25F 1/00* | (2006.01) |
| *C25D 11/02* | (2006.01) |
| *H04M 1/02* | (2006.01) |

(52) U.S. Cl.
CPC .......... *C25D 11/20* (2013.01); *C25D 11/024* (2013.01); *C25D 11/24* (2013.01); *C25D 11/243* (2013.01); *C25D 11/246* (2013.01); *C25F 1/00* (2013.01); *H04M 1/0202* (2013.01); *H04M 1/0283* (2013.01)

(58) Field of Classification Search
CPC ...................................................... C25D 11/20
See application file for complete search history.

(56) References Cited

U.S. PATENT DOCUMENTS

| | | | | |
|---|---|---|---|---|
| 4,431,489 | A | * 2/1984 | Baker | C25D 11/22 |
| | | | | 205/202 |
| 4,532,065 | A | 7/1985 | Cohen et al. | |
| 4,681,668 | A | * 7/1987 | Davies | C25D 11/08 |
| | | | | 205/139 |
| 4,879,006 | A | * 11/1989 | Turner | C02F 1/467 |
| | | | | 205/543 |
| 5,232,563 | A | * 8/1993 | Warfield | H01L 21/02052 |
| | | | | 205/766 |
| 5,362,370 | A | * 11/1994 | van der Heijden | C25F 1/00 |
| | | | | 205/705 |
| 5,705,225 | A | | 1/1998 | Dornfest et al. |
| 8,017,247 | B2 | | 9/2011 | Askin et al. |

(Continued)

*Primary Examiner* — Bryan D. Ripa
(74) *Attorney, Agent, or Firm* — Dickinson Wright RLLP (57) ABSTRACT

Processes for cleaning anodic film pore structures are described. The processes employ methods for gas generation within the pores to flush out contamination within the anodic film. The pore cleaning processes can eliminate cosmetic defects related to anodic pore contamination during the manufacturing process. For example, an anodic film that is adjacent to a polymer piece can experience contamination originating from a gap between the anodic film and polymer piece, which can inhibit colorant uptake of the anodic film in areas proximate the polymer piece. In some cases, an alternating current anodizing process or a separate operation of cathodic polarization is implemented to generate hydrogen gas that bubbles out of the pores, forcing the contaminates out of the anodic film.

18 Claims, 10 Drawing Sheets

(56) References Cited

U.S. PATENT DOCUMENTS

| | | | |
|---|---|---|---|
| 2008/0213618 A1* | 9/2008 | Critchlow | C25D 11/08 428/613 |
| 2008/0274375 A1* | 11/2008 | Ng | C25D 11/08 428/687 |
| 2010/0320089 A1* | 12/2010 | Misra | B82Y 30/00 205/109 |
| 2011/0241442 A1* | 10/2011 | Mittleman | H03K 17/962 307/112 |
| 2016/0152839 A1* | 6/2016 | Lai | C25D 11/16 205/202 |
| 2016/0168743 A1* | 6/2016 | Yoon | H01G 9/2031 205/223 |

* cited by examiner

PROCESS FOR CLEANING ANODIC OXIDE PORE STRUCTURES

CROSS REFERENCE TO RELATED APPLICATION

This application claims the benefit of priority under 35 U.S.C § 119(e) to U.S. Provisional Application No. 62/233,037, entitled "PROCESS FOR CLEANING ANODIC OXIDE PORE STRUCTURES," filed on Sep. 25, 2015, which is incorporated by reference herein in its entirety.

FIELD

The described embodiments relate generally to anodic films and anodizing processes. More particularly, the present embodiments relate to cleaning anodic films such that they more readily and uniformly accept colorants.

BACKGROUND

Enclosures for electronic devices can have sections made of various different materials, such as metals, plastics, glass and ceramics. Each type of material has different functional attributes. Metals, for example, can have high tensile strength, can be electrically conductive and can provide a durable cosmetically appealing surface. Some metals, such as aluminum and aluminum alloys, can be anodized so as to form a hard anodic oxide coating that protects the underlying metal and can be readily colored to various shades. Non-metals, such as plastics, are generally radio frequency transparent, and therefore can be positioned over radio frequency transmitting antennas housed within the electronic device without interrupting radio frequency transmission, or can be used to electrically isolate various distinct metal parts of an aluminum enclosure to enable them to act as antennae.

One of the challenges with manufacturing of electronic device enclosures relates to the integration of metal sections with non-metal sections. Surface finishing operations, such as polishing and anodizing, are generally performed after the metal sections are secured to the non-metal sections. This means that contaminants from these manufacturing processes can get trapped within gaps between the metal and non-metal sections. These contaminants can leach out of the gaps and get trapped within the anodic oxide coating, eventually interfering with the anodic oxide coating coloring process, resulting in non-uniform coloring and cosmetically unappealing defects of the anodic oxide coating.

SUMMARY

This paper describes various embodiments that relate to anodic oxide coatings and processes for cleaning anodic oxide coatings. The processes involve the generation of gas within pores of the anodic oxide coatings so as to flush out contaminants that reside within the pores as a result, for example, of various preceding manufacturing operations.

According to one embodiment, a method of cleaning an anodic oxide coating on a substrate is described. The method includes immersing the substrate in a solution. The method also includes generating a flow of bubbles from within pores of the anodic oxide coating and out of the pores. The flow of bubbles force contaminants residing within the pores out of the pores.

According to another embodiment, a method of cleaning an anodic oxide coating on an enclosure for an electronic device is described. The enclosure includes a metal section having the anodic oxide coating and a non-metal section adjacent to the metal section. The method includes immersing the enclosure within a solution. The method also includes generating a flow of bubbles from within the anodic oxide coating. The flow of bubbles exit the anodic oxide through pores of the anodic oxide coating, thereby cleaning the anodic oxide coating.

According to a further embodiment, a method of anodizing a substrate is described. The method includes immersing the substrate in an anodizing electrolyte. The method also includes applying an alternating current to the substrate such that a potential at the substrate oscillates between anodic polarization cycles and cathodic polarization cycles. Surface portions of the substrate are converted to an anodic oxide during the anodic polarization cycles and hydrogen gas is generated within the anodic oxide during the cathodic polarization cycles. The hydrogen gas generates a flow of bubbles from within the pores that exit out of the pores.

These and other embodiments will be described in detail below.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Processes for cleaning anodic oxide pore structures are described. Methods include generating bubbles within pores of an anodic oxide coating, during or after an anodizing process, that flush out contaminants residing within or around the pores. The pore cleaning processes are well suited for cleaning composite parts that include anodized metal portions that are adjacent to non-metal portions. Contaminants can get trapped within crevices between the metal and non-metal portions during various manufacturing processes, which can seep out of the crevices and work their way into the pores structures, subsequently inhibiting uniform dye uptake, and eventually leading to cosmetic defects.

The bubbles can be generated using any of a number of electrolytic techniques, ultrasonic techniques, low-pressure cycling techniques, or suitable combinations thereof. In some embodiments, the bubbles are created by gas evolution within the anodic coating itself near the underlying substrate at bases of the pores (also referred to as pore terminuses). In some cases, this involves an AC anodizing process that includes cathodic polarization cycles in periods between oxide growth. In one embodiment, a high potential (such as a 15-20 V AC anodizing potential) and/or current density (such as 1-4 A/dm$^2$) is applied. This high electrical potential and/or high current density can provide a forceful flow of bubbles and cleaning action. In other cases, AC polarization cycles are performed in operations other than the anodizing process, such as during a metal electrodepositing coloring process, if used.

As used herein, the terms anodic oxide, anodic oxide coating, anodic film, anodic layer, anodic coating, oxide film, oxide layer, oxide coating, metal oxide, etc. can be used interchangeably and can refer to suitable metal oxide materials, unless otherwise specified.

Methods described herein are well suited for providing cosmetically appealing surface finishes to consumer products. For example, the methods described herein can be used to form durable and cosmetically appealing anodized finishes for housing for computers, portable electronic devices, wearable electronic devices, and electronic device accessories, such as those manufactured by Apple Inc., based in Cupertino, Calif.

These and other embodiments are discussed below with reference to FIGS. 1-9. However, those skilled in the art will readily appreciate that the detailed description given herein with respect to these Figures is for explanatory purposes only and should not be construed as limiting.

Figure 1:
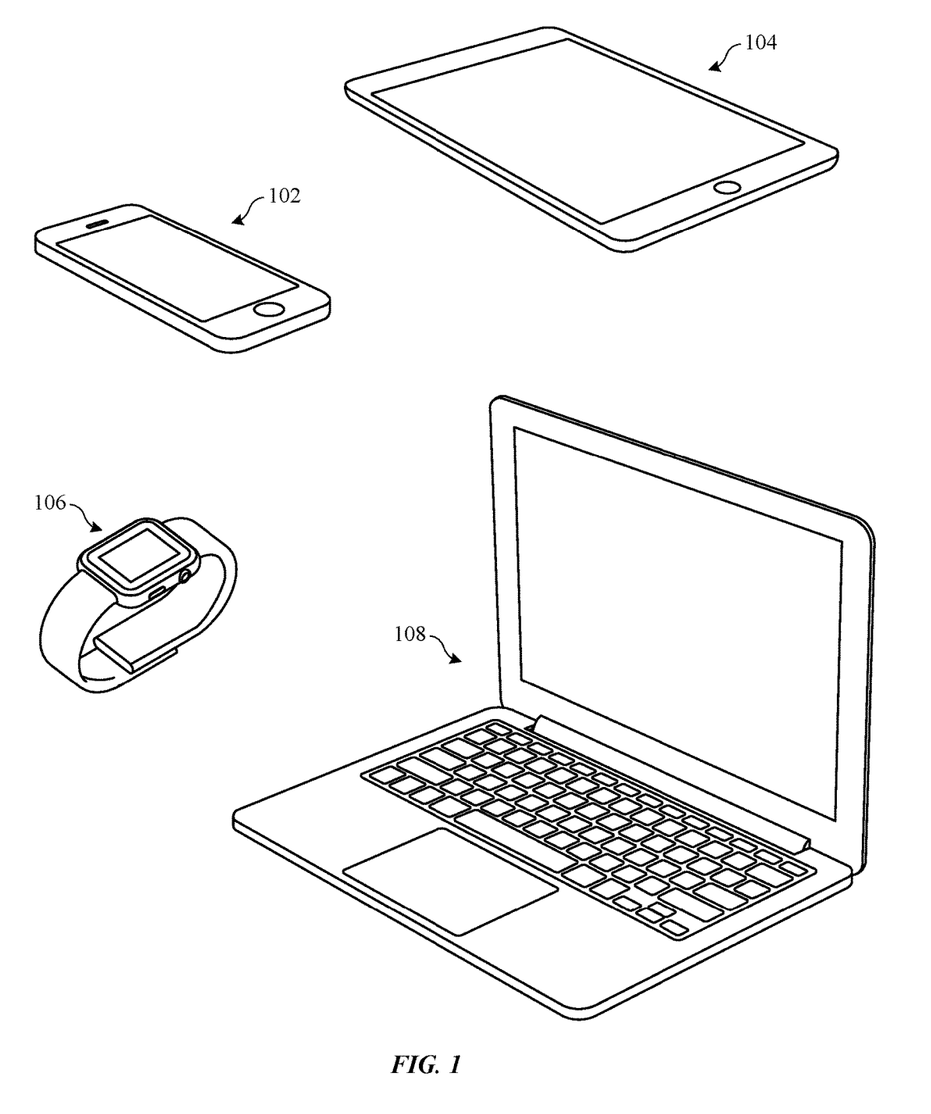
FIG. 1 shows perspective views of devices having anodized surfaces that can be treated using the pore cleaning processes described herein.

The methods described herein can be used to form durable and cosmetically appealing anodic oxide coatings for metallic surfaces of consumer devices. FIG. 1 shows consumer products than can be manufactured using methods described herein. FIG. 1 includes portable phone 102, tablet computer 104, smart watch 106 and portable computer 108, which each can include housings that are made of metal or have metal sections. Aluminum alloys are often a choice metal material due to their light weight and ability to anodize and form a protective anodic oxide coating that protects the metal surfaces from scratches. The anodic oxide coatings can be colorized by infusing dyes within pores of the anodic oxide coatings, adding numerous cosmetic options for product lines.

In some cases, the anodized metal sections of the enclosures for devices 102, 104, 106 and 108 are positioned adjacent to plastic sections or other non-metallic sections of the enclosures. This means that small gaps are formed at the interface between the metal and non-metallic sections. During manufacturing operations, such as surface finishing or machining operations, contaminants such as chemical residues can become trapped within these small gaps. These contaminants can work their way into the pores of the anodic oxide coating, thereby interrupting the uptake of dye within portions of the anodic oxide coatings adjacent to the plastic sections. The result is unsightly unevenly colored anodic oxide coatings.

Figure 2A:
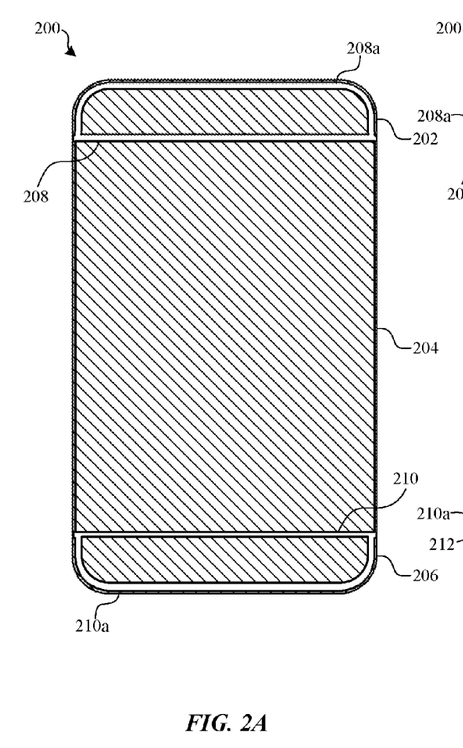
FIGS. 2A and 2B show plan views of an enclosure having metal and non-metal sections.
Figure 2B:
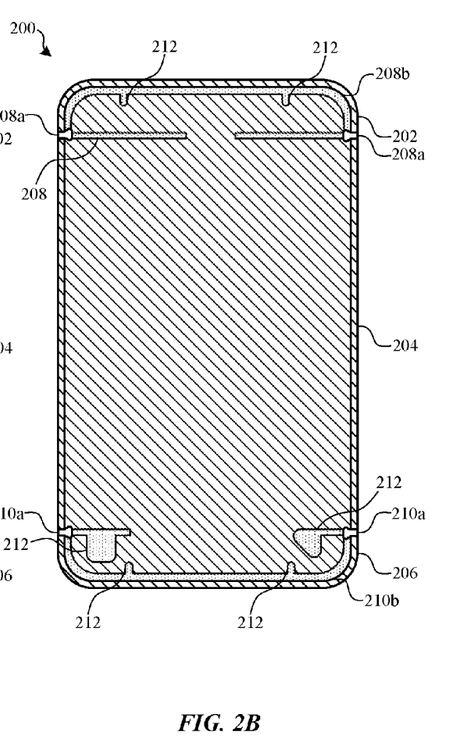

To illustrate a specific example, FIGS. 2A and 2B show plan views of enclosure 200 of an electronic device, such as a portable phone. FIG. 2A shows an exterior view of enclosure 200, which is observable to a user of the electronic device, and FIG. 2B shows an interior view of the enclosure 200, which may not be readily observable to the user. In some embodiments, enclosure 200 corresponds to a rear portion of the electronic device, which couples with a front portion (not shown) to enclose internal components (e.g., processor circuits, memory circuits, flexible circuits, battery, etc.). Enclosure 200 includes metal sections 202, 204, and 206 separated by non-metal sections 208 and 210. Metal sections 202, 204, and 206 can be coated with an anodic oxide coating, which can be colorized as described above.

In some cases, non-metal sections 208 and 210 are made of plastic, such as thermoplastic material that is molded onto surfaces of metal sections 202, 204, and 206. Non-metal sections 208 and 210 can allow radio frequency wave communication, to pass through enclosure 200 to and/or from an antenna housed within the electronic device. Thus, non-metal sections 208 and 210 can be referred to as radio-transparent sections of enclosure 200. In some cases, metal sections 202, 204, and/or 206 act as part of an antenna assembly of the electronic device, in which case non-metal sections 208 and 210 can serve to electrically isolate metal sections 202, 204, and 206 from each other. In some embodiments, non-metal sections 208 and 210 are molded within recessed or protruding features 212 of metal sections 202, 204, and 206 to improve engagement and adhesion of non-metal sections 208 and 210 to metal sections 202, 204, and 206. In some embodiments, non-metal sections 208 and 210 includes cosmetic portions 208a and 210a, which are visible to a user of the electronic device, and structural portions 208b and 210b, which may not be readily visible to the user and provide increased structural integrity and secure bonding with metal sections 202, 204, and 206.

During manufacturing operations, contaminants such as chemical residues can become trapped within small gaps between adjacent non-metal sections 208 and 210 and metal sections 202, 204, and 206, which can inhibiting uniform dye uptake and eventually lead to cosmetic defects within enclosure 200. The manufacturing methods described herein can be implemented to reduce the occurrence of these defects. To illustrate, FIGS. 2C and 2D illustrate views of an exterior portion of enclosure 220 manufactured using a standard manufacturing process and an exterior portion of enclosure 250 manufactured using an anodic pore cleaning process described herein.

Figure 2C:
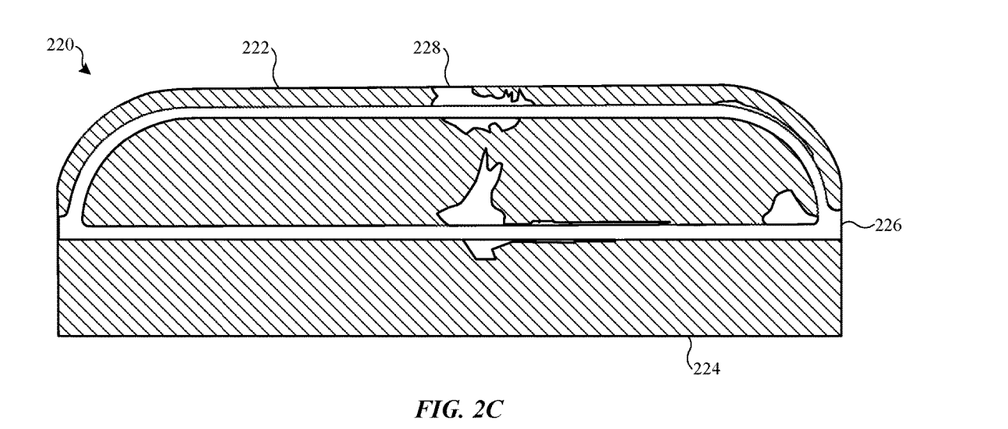
FIGS. 2C and 2D show plan views of a portion of an enclosure treated using a standard manufacturing process and an enclosure treated with an anodic pore cleaning process in accordance with some embodiments.

At FIG. 2C, enclosure 220 includes metal sections 222 and 224 coupled together by non-metal section 226. Non-metal section 226 can correspond to a radio-transparent section of enclosure 220. As with enclosure 200, non-metal section 226 can correspond to a radio-transparent section of enclosure 220 that allows radio-frequency transmission to pass to and/or from an antenna housed within enclosure 220, or can serve to electrically isolate the two adjoining metal sections 222 and 224 to allow one of them to serve as an antenna. Metal sections 222, 224, 226 are each anodized and colorized such that a colored anodic surface coating is formed thereon. During the anodizing process or other operations, contaminants can get trapped within gaps between metal sections 222 and 224 and non-metal section 226. These contaminants disrupt the uptake of colorant during a subsequent coloring process, which causes visual defects 228 to form within the anodic coating of near metal sections 222 and 224 the interfaces between metal sections 222 and 224 and non-metal section 226.

Figure 2D:
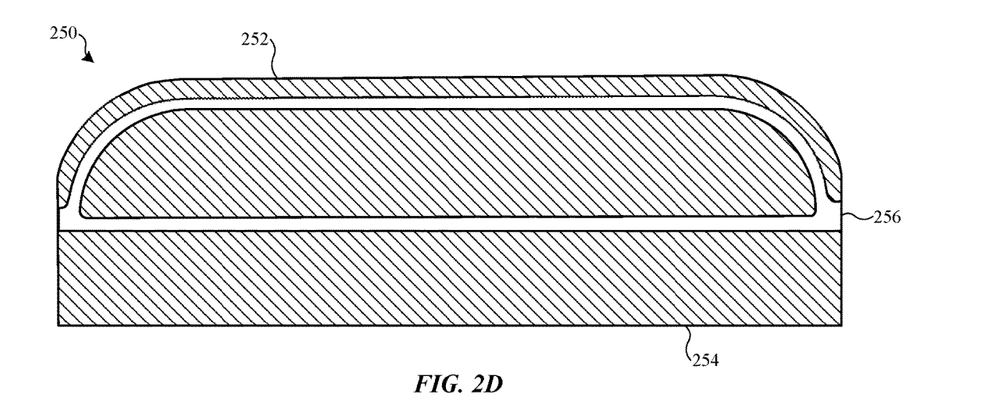

At FIG. 2D, enclosure 250 includes metal sections 252 and 254 coupled together by non-metal section 256. Enclosure 250 has been treated using a pore cleaning process described herein to clean the anodic coating of metal sections 252 and 254. As with enclosures 200 and 220, non-metal section 256 can correspond to a radio-transparent section of enclosure 250 that allows radio-frequency transmission to pass to and/or from an antenna housed within enclosure 250, or can serve to electrically isolate the two adjoining metal sections 252 and 254 to allow one of them to serve as an antenna. Metal sections 252 and 254 are anodized and colorized to form a colored anodic surface coating. The pore cleaning process cleans the pores from contaminants such that interfaces between non-metal section 256 and adjacent metal sections 252 and 254 can properly uptake colorant, creating a defect-free and uniformly colored anodic coating on metal sections 252 and 254.

Figure 3A:
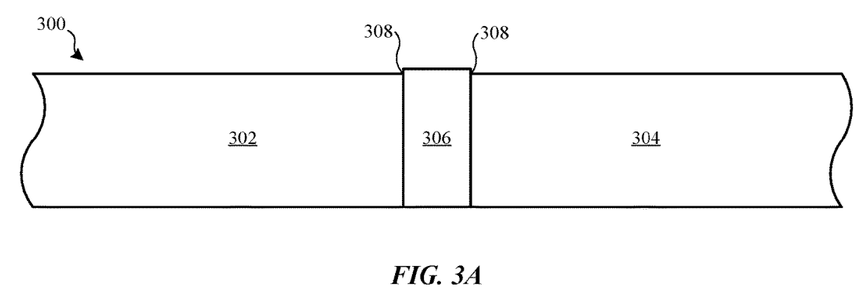
FIGS. 3A-3C show cross-section views of a part undergoing a manufacturing operation illustrating how contaminants can get trapped within gaps between metal and non-metal sections.
Figure 3B:
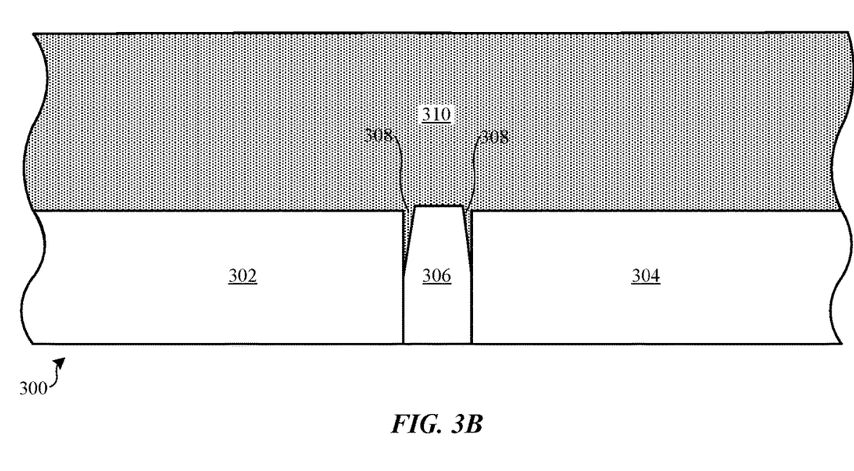
Figure 3C:
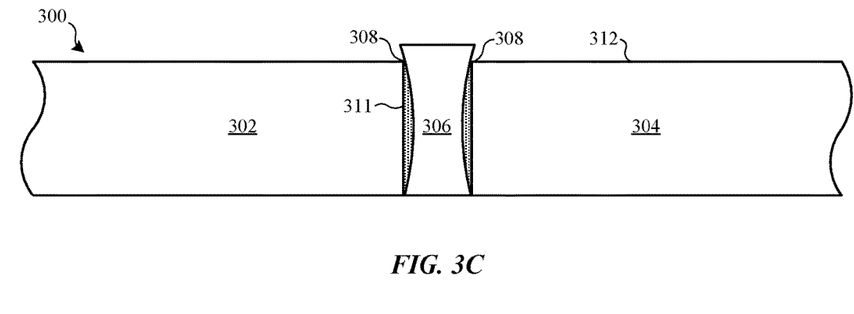

FIGS. 3A-3C show cross-section views of part 300 undergoing a manufacturing operation illustrating how contaminants can get trapped within gaps between metal and non-metal sections of part 300. FIG. 3A shows part 300 prior to the manufacturing operation. Part 300 includes first metal section 302 and second metal section 304 separated by non-metal section 306. In some embodiments, part 300 corresponds to an enclosure for an electronic device. In some embodiments, first metal section 302 and second metal section 304 are each made of aluminum alloy, and non-metal section 306 is made of plastic. Non-metal section 306 can be radio-transparent so as to let radio frequency waves pass therethrough. Gaps 308 exist at the interfaces between first metal section 302 and non-metal section 306, and between second metal section 304 and non-metal section 306.

FIG. 3B shows part 300 undergoing a manufacturing operation in which part 300 is immersed in solution 310. The manufacturing process can be, for example, a pre-anodizing operation that conditions first metal section 302 and/or second metal section 304 prior to anodizing. For example, solution 310 can be a chemical etching solution, such as a hot phosphoric acid solution, that polishes exposed surfaces of first metal section 302 and/or second metal section 304. In a particular chemical polishing embodiment, solution 310 is at temperatures of around 80 degrees Celsius. Since first 302 and second 304 metal sections are made of different materials than non-metal section 306, the hot solution 310 can cause differential thermal expansion of first 302 and second 304 metal sections compared to non-metal section 306. This can distort the shape of non-metal section 306, thereby widening gaps 308. As such, solution 310 can easily enter gaps 308.

Note that the manufacturing operation is not limited to chemical polishing operation, or even limited to pre-anodizing operations. For example, the manufacturing operation can be the anodizing process itself where part 300 is immersed within a solution 310 corresponding to an electrolytic bath. Solution 310 can be an etching solution, such as a hot caustic solution, for cleaning oils and contamination off of part 300 after a machining operation. Furthermore, solution 310 may not necessarily be a hot solution. For example, some anodizing processes dictate an electrolytic bath temperature around 25 degrees Celsius. It is noted, however, that higher temperature solutions 310 may cause more distortion and widening of gaps 308 such that solution 310 can more easily enter gaps 308.

FIG. 3C shows part 300 after removal from solution 310. As shown, some solution 310 remains within gaps 308 and has become entrapped as contaminants 311. The constitution of contaminants 311 will depend on the type of solution 310. For example, a phosphoric acid solution or sulfuric acid solution can cause contaminants 311 to include phosphates or sulfates, respectively. If solution 310 is a hot solution and part is returned to room temperature, gaps 308 can return to their pre-widened state, thereby further entrapping contaminants 311 within gaps 308. In some embodiments, part 300 is rinsed in cold water to remove residues of solution 310 from external surfaces 312 of part 300. The cold temperature can cause opposite distortion of non-metal section 306, narrowing or closing gaps 308 and exacerbating the entrapment of contaminants 311 within gaps 308. Once removed from the cold rinse(s), gaps 308 can reopen during subsequent higher temperature processes, such as an anodizing process and/or an anodic film coloring process, when contaminants 311 will be released and enter the porous structure of an anodic coating. This is shown in FIGS. 4A-4C.

Figure 4A:
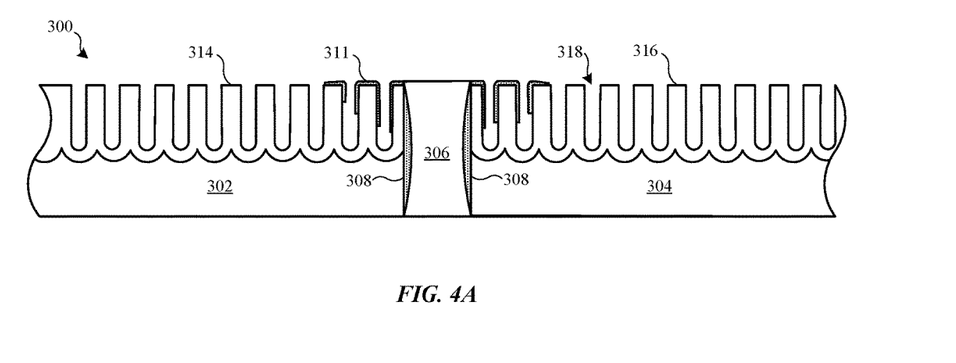
FIGS. 4A-4C show close-up cross section views of the part of FIGS. 3A-3C during an anodizing process and a dyeing process, illustrating how trapped contaminants can lead to visible defects.
Figure 4B:
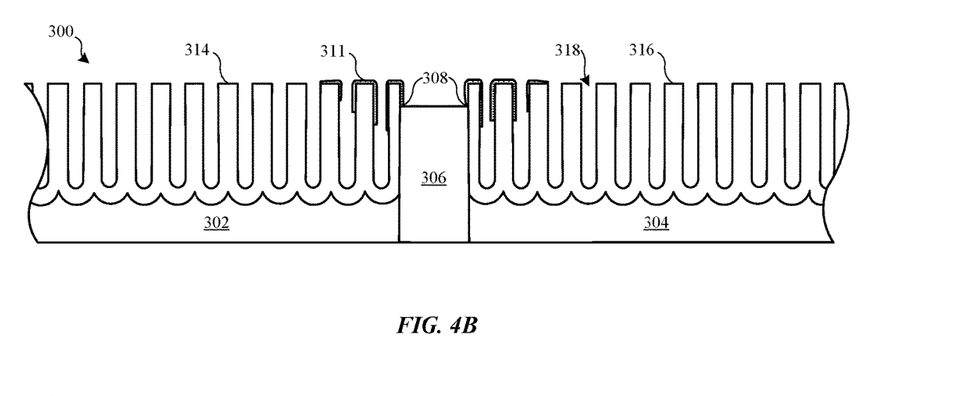
Figure 4C:
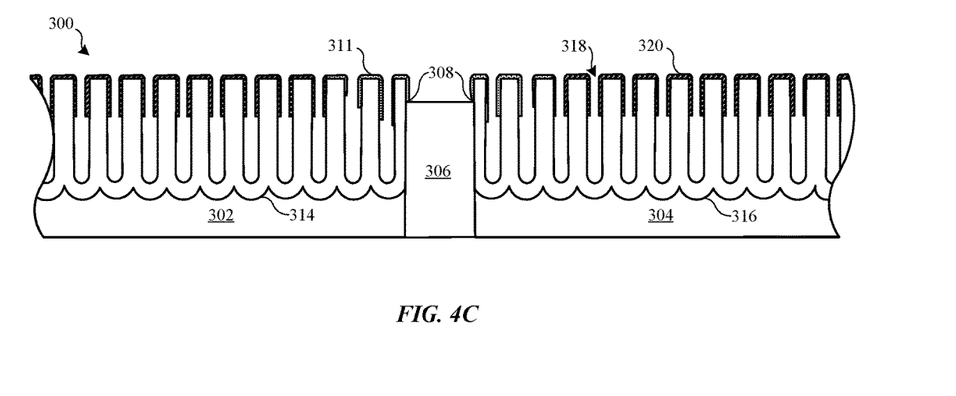

FIGS. 4A-4C show close-up cross section views of part 300 during an anodizing process and a dyeing process, illustrating how trapped contaminants 311 can lead to visible defects. FIG. 4A shows part 300 undergoing an anodizing process whereby portions of first metal section 302 and second metal section 304 are converted to first anodic coating 314 and second anodic coating 316, respectively. First anodic coating 314 and second anodic coating 316 have porous structures in that pores 318 form therein during the anodizing process. Surface portions of first metal section 302 and second metal section 304 are consumed such that the contaminants 311 leach out of gaps 308 and contaminate pores 318 adjacent to non-metal section 306. In particular, contaminants 311 can become displaced on external surfaces of first 314 and second 316 anodic coatings and/or within pores 318 adjacent to non-metal section 306.

In some embodiments, the anodizing process is a Type II anodizing process as defined by U.S. military specification MIL-A-8625, whereby a resultant anodic coating possesses a very fine pore structure such that pores 318 readily absorb dyes, and is therefore well suited for coloring. Unfortunately, this fine pore structure also makes it easier for contaminants 311 to enter pores 318.

FIG. 4B shows part 300 as the anodizing process progresses and more of first metal section 302 and second metal section 304 are converted to first anodic coating 314 and second anodic coating 316, respectively. In some embodiments, the growth of 314 and second 316 anodic coatings results in an external surface of non-metal section 306 recessed with respect to external surfaces of first 314 and second 316 anodic coatings. In some cases, non-metal section 306 returns to its pre-distorted state such that gaps 308 are narrowed, which can cause more of contaminants 311 to be forces out of gaps 308 and onto and/or into adjacent pores 318.

At FIG. 4C, part 300 is exposed to a dyeing process whereby colorant 320 is deposited onto first 314 and second 316 anodic coatings and/or infused within pores 318. Colorant 320 can be an organic dye, inorganic dye or a metallic colorant. Contaminants 311 inhibit the uptake of colorant 320 within pores 318 and/or on first 314 and second 316 anodic coatings, resulting in areas of first 314 and second 316 anodic coatings near non-metal section 306 having a visibly different color than surrounding dyed portions. This uneven coloration can be an unacceptable cosmetic defect, wherein either light or dark "staining" of the dyed surface is visible. Some these defects can be attenuated by more thorough cleaning process—in some cases using more than fifteen consecutive rinsing processes between the anodizing and dyeing processes. However, these rinses can be time consuming and may still not eliminate these defects.

The present paper provides a way of eliminating these defects by cleaning the anodic oxide pore structure of contaminants 311, or avoiding the uptake of contaminants 311 during the anodizing process.

Figure 5A:
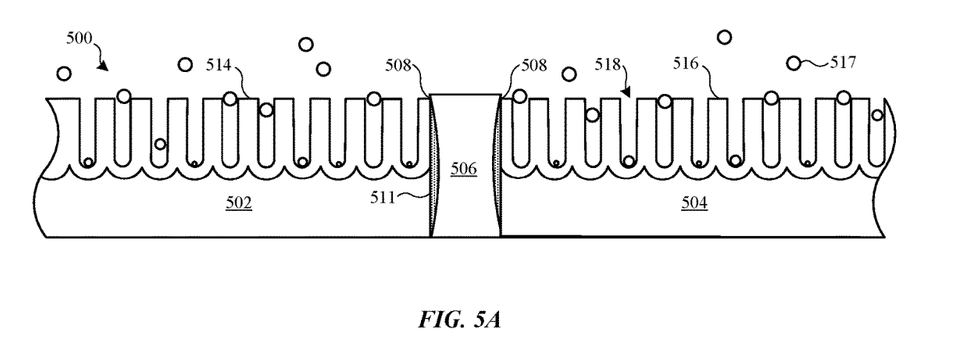
FIGS. 5A and 5B show cross section views of a part undergoing a pore cleaning process in accordance with some embodiments.
Figure 5B:
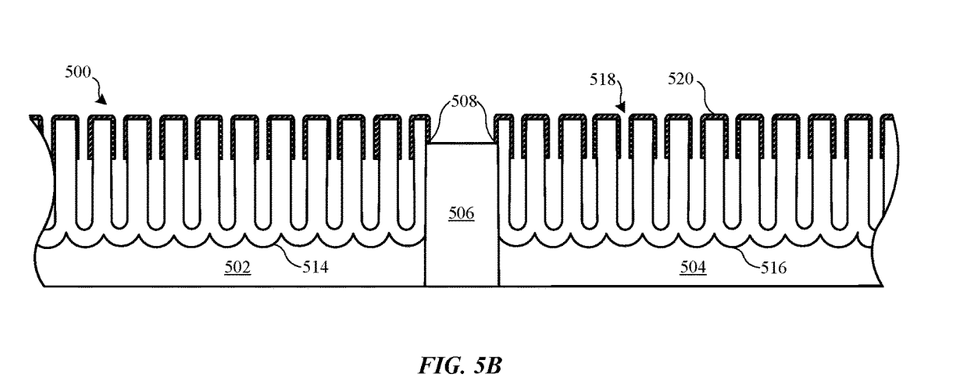

FIGS. 5A and 5B show cross section views of portions of part 500 undergoing a pore cleaning process in accordance with some embodiments. Part 500 includes first metal section 502 and second metal section 504 separated by non-metal section 506. In a particular embodiment, first 502 and second 504 metal sections are each made of aluminum alloy, and non-metal section 506 is made of plastic. Non-metal section 506 can be radio-transparent so as to let radio frequency waves pass, and one or both of first 502 and second 504 metal sections may act as part of an antenna assembly of an electronic device. Gaps 508 exist at the interfaces between first metal section 502 and non-metal section 506, and between second metal section 504 and non-metal section 506. Gaps 508 can have contaminants 511 trapped therein. Contaminants 511 can be trapped during, for example, a pre-anodizing process as described above.

FIG. 5A shows part 500 undergoing a modified anodizing process that includes anodizing as well as anodic pore cleaning. Part 500 is immersed in an anodizing electrolytic solution (not shown) and an electric potential is applied such that portions of first 502 and second 504 metal sections are converted to first anodic coating 514 and second anodic coating 516, respectively. During the anodizing, part 500 acts as an anode electrode. The applied current releases hydrogen ($H_2$) at the cathode (not shown) and oxygen ($O_2$) at the surface of anode part 500, creating a build up of metal oxide corresponding to first 514 and second 516 anodic coatings.

In addition to the anodizing process, the current polarization is periodically switched such that part 500 periodically acts as a cathode, during which time growth of first 514 and second 516 anodic coatings is halted. Thus, during the modified anodizing process part 500 switches from acting as an anode, referred to as an anodic polarization cycle, and as a cathode, referred to as a cathodic polarization cycle. During the cathodic polarization cycle, hydrogen is released from part 500—in particular, from within pores 518 near underlying metal sections 502 and 504, also referred to as pore terminuses. The hydrogen gas is a result of the breakdown of water from the anodizing solution. This evolved gas is release from pores 518 in the form of bubbles 517, which force out any contaminants 511 trapped within pores 518 and/or the exterior surfaces of first 514 and second 516 anodic coatings. In this way, the porous structure of first 514 and second 516 anodic coatings is purged and cleared of contaminants 511.

The switch between cathodic and anodic polarizations can be achieved using a number of techniques. One technique involves applying an alternating current (AC) to part 500 during the anodizing process, instead of a conventional applied direct current (DC) for anodizing. Another technique involves using DC current that is switched between negative and positive polarities at one or more periods during the immersion of part 500 in the anodizing process tank. Details and variations of some of these techniques are described below with reference to FIGS. 6, 7A-7C and 8A-8C.

In an alternative embodiment, applying higher anodic potentials during an anodizing process could generate bubbles 517 of oxygen evolved from the terminuses of pores 518. However, this embodiment would require high electric potentials that would be associated with a correspondingly high growth rate of first 514 and second 516 anodic coatings. In some situations, this high growth rate and/or high current density may be damaging to first 514 and second 516 anodic coatings as they are growing.

Further embodiments of the gas generation within pores 518 can include ultrasonic agitation of a solution, or the application of low-pressure cycles to a solution. In the case of ultrasonic agitation, the ultrasonic pressure can create bubbles 517 by cavitation. In the case of low-pressure cycles, part 500 can be immersed in a solution that is then placed under relatively low pressure or vacuum, which causes gases incorporated within first 514 and second 516 anodic coatings to outgas, thereby creating bubbles 517. In some embodiments, the ultrasonic agitation and/or low-pressure cycles is/are combined with the electrolytic polarization cycling or high potential anodizing processes described above.

FIG. 5B shows part 500 after the modified anodizing process is complete and colorant 520 is infused within pores 518 of first 514 and second 516 anodic coatings. Colorant 520 can be an organic dye, inorganic dye and/or an electrodeposited metal colorant. First 514 and second 516 anodic coatings are uniformly infused with colorant 520 in the absence of contaminants 511, resulting in a consistently colored and cosmetically appealing part 500. In some cases, contaminants 511 can still exist within gaps 508. Therefore, one may be able to detect whether the pore cleaning processes described herein have been implementing by chemically identifying contaminants 511 within gaps 508 and establishing that pores 518 are substantially free of contaminants 511.

In a particular embodiment, the pore cleaning operation is accomplished during the coloring operation subsequent to the anodizing. For example, an electrodeposition process can be used to electrolytically deposit a metal colorant 520 within pores 518. For instance, copper and/or tin may be deposited from copper sulfate or tin sulfate solutions, respectively, under alternating current conditions. During cathodic polarization cycles, the metal is deposited within pores 518—while during anodic polarization cycles, oxygen gas is generated at the terminuses of pores 518 that flushed out contaminants.

It should be noted that an electrodeposition process can be, in itself, less sensitive to the contaminant-related defects described above for non-metal dyes since electrodeposited metal colorants do not generally depend on absorption of the dyes into the pore structure, but instead achieve coloration from the optical response of metal deposited in the pore terminuses. Nevertheless, part 500 can be both electro-colored with metal colorant as well as dyed using a non-metal colorant to adjust a final color—especially where light shades of electro-coloring are applied. In such cases, the pore cleaning processes described herein can greatly improve the uniformity of dyed anodic coatings.

In addition to the aforementioned benefit to the cosmetics of a colored anodic coating of a part, and especially those parts that incorporate non-metal into their design, the pore cleaning processes can be of benefit in improving adhesive bonding to porous anodic oxide structures. For instance, a molded material can be injection molded to the anodic oxide coating to create a composite part. If the pores of the anodic oxide coating are free from contaminants, the molded material can be more effectively injected into the clean pores, creating a strong interlocking bond with the anodic oxide coating. The pore cleaning process may also overcome localized defects in the sealing of the anodic oxide surface, since typical pore contaminants include phosphates and sulfates, both of which can inhibit the typical hydrothermal sealing processes which are most widely used for the protection of anodic oxide coatings.

Note that pore cleaning processes described above may modify the structure or shape of anodic pore structures. In particular, electrolytic polarization cycling and/or high potential anodizing processes described above may change the structure or shape of the pore base and/or the pore walls as compared to standard Type II anodizing processes, which can be detected by analyzing the anodic oxide coatings using high resolution electron microscopy.

Figure 6:
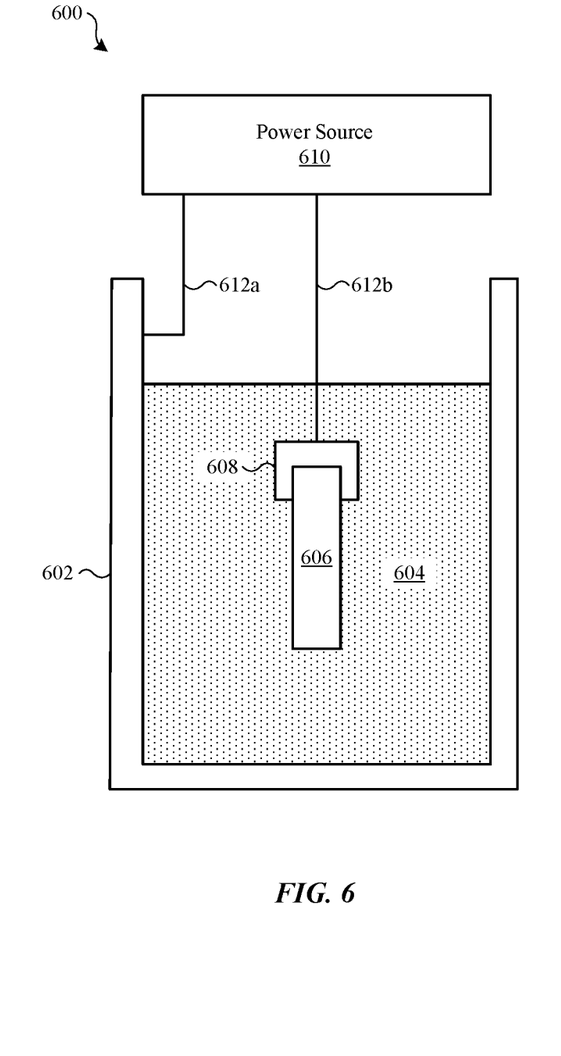
FIG. 6 shows a system suitable for performing an anodic pore cleaning process in accordance with some embodiments.

FIG. 6 shows system 600 suitable for performing an anodic pore cleaning process in accordance with some embodiments. System 600 includes tank 602 suitable for holding solution 604. Part 606 can be supported by fixture 608 and immersed within solution 604. Part 606 can be electrically coupled to power source 610 by wires 612*a* and 612*b*. Power source 610 can include a rectifier that switches the type of current supplied to part 606 between AC and DC. System 600 can be used in a modified anodizing process that includes a pore cleaning process, a modified electrodepositing process that includes a pore cleaning process, or process solely dedicated to pore cleaning. That is, the pore cleaning can be performed during an anodizing process, during an electrodepositing process (e.g., for electro-coloring an anodic oxide film), or in a stand-alone process separate from other processes.

In conventional anodizing processes, a DC current is applied to part 606 causing release of oxygen ($O_2$) at the surface of part 606 and creating a build up of metal oxide corresponding to an anodic oxide film. In addition, hydrogen ($H_2$) is released at the cathode, which can correspond to tank 602 in the set up of system 600. In an anodizing process modified to include a pore cleaning process, part 606 acts as both an anode and a cathode. This can be accomplished by using AC current, in which the current polarization is periodically reversed, or by using a reversing DC current. Some suitable AC and DC waveforms or processing sequences are described in detail below with reference to FIGS. 7A-7C and 8A-8C.

During positive current polarization, also referred to as an anodic polarization cycle, part 606 acts as an anode thereby promoting anodic oxide film growth. During negative current polarization, also referred to as a cathodic polarization cycle, part 606 acts as a cathode such that oxide film growth is halted and hydrogen gas is released from part 606 to clean the pores. In this way, the modified anodizing process can generate hydrogen gas throughout the anodizing process thereby continuously cleaning the pores. In other respects, the anodizing process can be similar to conventional anodizing processes. For example, in one embodiment, solution 604 is a sulfuric acid solution maintained at a temperature ranging between about 10 to about 30 degrees Celsius. The voltage and current density of the cathodic cycle can be adjusted to generate a sufficient amount of gas and provide a strong enough flow of bubbles to force the contaminants out of the pores. Lower amplitude current densities may not create an amount of gas necessary to sufficient clean the pores, whereas too high of a current density may damage the pore structure. In a particular embodiment where an AC current is used, the root mean square (RMS) voltage ranges between about 8 and 25 volts, and the current density ranges between about 0.5 and about 3.0 A/dm$^2$. The duration of modified anodizing process can vary depending on a desired thickness of the anodic film. In one embodiment with a target anodic film thickness of 10 micrometers, the AC current anodizing time period is about 30 minutes or more.

In other embodiments, the pore cleaning process is performed in an operation separate from the anodizing process. For instance, the pore cleaning process can be integrated into a metal deposition process used to color the anodic coating. In practice, this would occur after the anodizing process where part 606 is placed into solution 604 containing a metal salt solution (e.g., 5% or 10% tin sulfate solution). In conventional electrodepositing, a part acts as a cathode that attracts positively charged metal ions from solution, which then get deposited within the pores of the anodic oxide film.

In a modified metal deposition process that involves pore cleaning, an AC current can be used such that oxygen gas is evolved at part 606, specifically at the terminuses of the pores, between periods of electrodepositing of metal. As with the modified anodizing process described above, a modified electrodepositing process can involve some periods of time mainly dedicated to pore cleaning and other periods of time mainly dedicated to electrodepositing metal. For example, the pore cleaning time periods can involve use of AC while electrodepositing time periods can involve use of DC.

In other embodiments, the pore cleaning process is performed in a separate solution than an anodizing solution or an electrodepositing solution (if used). For example, part 600 can be removed from the anodizing bath and immersed within solution 604 that is dedicated to a pore cleaning process. This can give flexibility as to the type of solution 604 used. For example, solution 604 can be ionic but pH neutral, or mildly acidic, reducing the risk of damaging the anodic oxide film during the cathodic cleaning cycles. In some embodiments, solution 604 is water. However, it may be preferable for solution 604 to be at least slightly ionic such that sufficient current can pass through solution 604. Solution 604 may be selected so as to have a high dissolving power for a given contaminant—for example, a solution of dilute nitric acid may be selected to promote the dissolution of phosphates.

It should be noted that in conventional aluminum anodizing processes, fixture 608 and wires 612*a* and 612*b* are made of a metal that is corrosion resistant to the anodizing process, such as titanium. However, if metals, such as titanium, are exposed within the solution during the cathodic polarization cycle, the hydrogen gas will be mainly generated at these metal surfaces rather than at part 606. This is because exposed titanium presents an easier path for current under a cathodic polarization cycle and can minimize or eliminate the rate of hydrogen evolution at part 606 to a degree where it is insufficient for pore cleaning. Thus, fixture 608 should allow a sufficient cathodic potential to be achieved for a substantial flow of gas to be generated within the pores. Therefore, in pore cleaning processes, exposed metal surfaces of fixture 608 and wires 612*a* and 612*b* should be coated with a non-conductive material, such as a polymer sheathing. Alternatively, fixture 608 and/or wires 612*a* and 612*b* can be made of the same material as part 606 (e.g., aluminum), which is also anodized during the modified anodizing process. However, an anodic film would build up on fixture 608 and/or wires 612*a* and 612*b*, and therefore would need to be periodically replaced or cleaned of the anodic film buildup between anodizing processes.

Figure 7A:
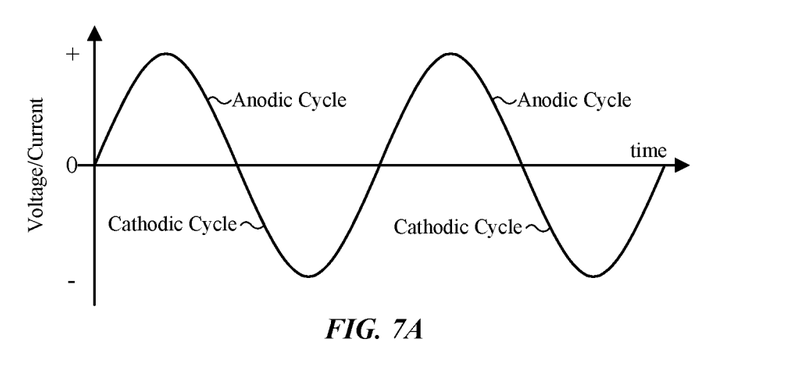
FIGS. 7A-7C show plots of different AC waveforms for various pore cleaning process.
Figure 7B:
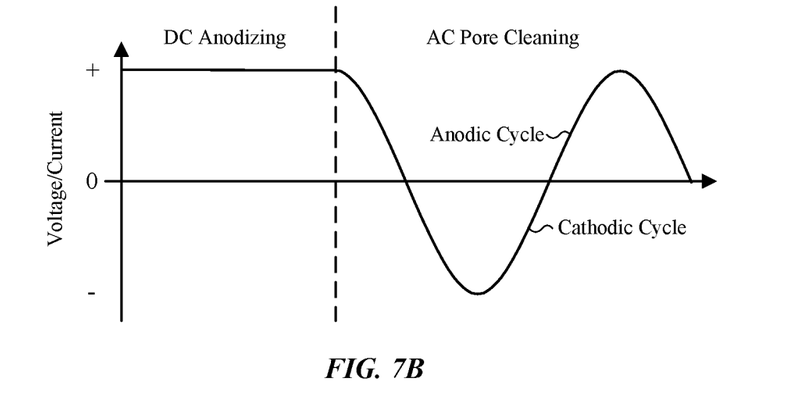
Figure 7C:
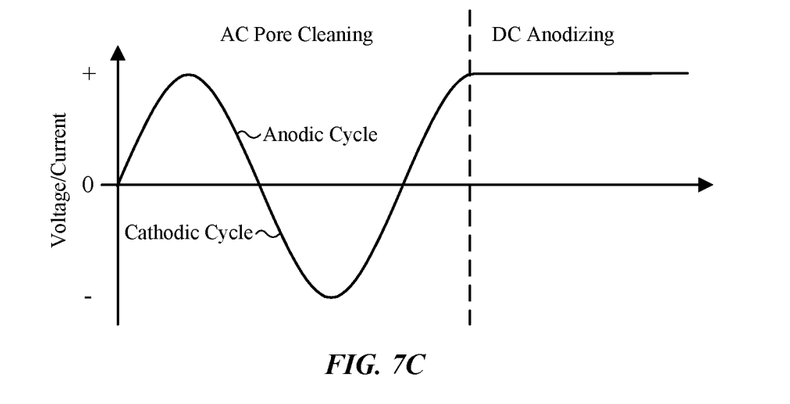

FIGS. 7A-7C show plots of different AC waveforms for various pore cleaning process. The pore cleaning processes can be performed during an anodizing or metal electrodepositing process, or in a stand-alone pore cleaning process. FIG. 7A shows a standard sinusoidal AC current in which the current/voltage continuously oscillates between anodic polarization cycles (positive) and cathodic polarization cycles (negative). Note that the frequency of the AC current can vary. In some embodiments, a 50 Hz AC current was used. If the process is an anodizing process, oxide growth occurs during anodic polarization cycles while pore cleaning occurs during cathodic polarization cycles. If the process is a metal electrodepositing process, metal deposition occurs during cathodic polarization cycles while pore cleaning occurs during anodic polarization cycles. In some embodiments, it is preferred that the entire anodizing process is conducted under AC conditions, such that gas is evolved throughout the process and a single processing operation is involved for both the anodic oxide growth and pore cleaning.

Alternatively, an AC pore cleaning process can be combined with a DC anodizing process. FIG. 7B shows a variation of a modified anodizing process where standard DC anodizing occurs during a first period of time such that an initial anodic oxide film is grown. Then, the current is switched to an AC current for a pore cleaning period of time. The duration of the AC pore cleaning can vary depending on a number of factors such as the voltage and/or current density. In some embodiments, the AC pore cleaning is relatively brief (e.g., seconds or minutes) compared to the DC anodizing process. FIG. 7C shows another variation in which the AC pore cleaning is performed before the DC anodizing. This embodiment may be used in instances where the benefit may be accrued mainly from cleaning of the metal surfaces and the gap between adjacent metal and non-metal sections of a part prior to anodizing.

Figure 8A:
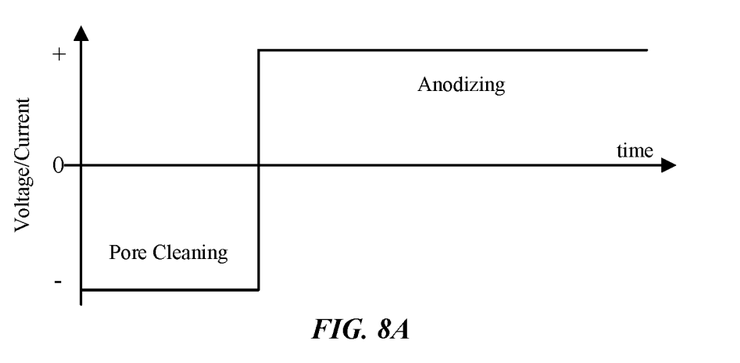
FIGS. 8A-8C show plots of different DC processing sequences that can be used in various types of anodizing processes that include a pore cleaning process.
Figure 8B:
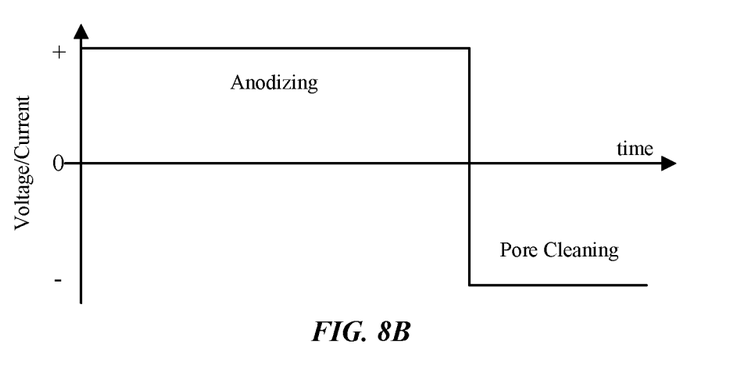
Figure 8C:
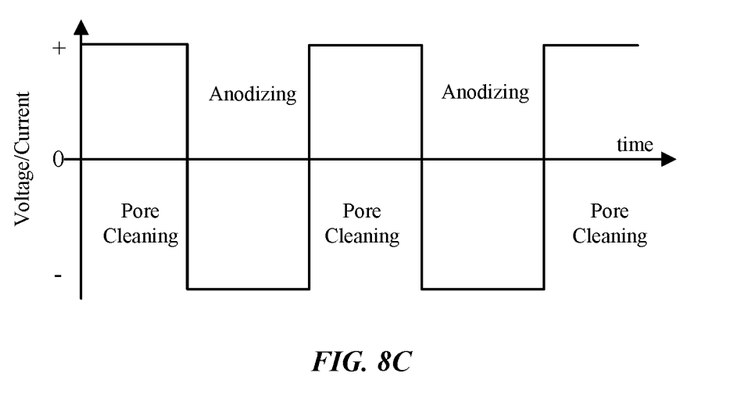

FIGS. 8A-8C show plots of different DC processing sequences that can be used in various types of anodizing processes that include a pore cleaning process. FIG. 8A shows a processing sequence where the pore cleaning occurs during an initial time period, then the polarization is switched for anodizing for a remainder time period. FIG. 8B shows the reverse, wherein pore cleaning occurs after the anodizing. FIG. 8C shows a processing sequence where the voltage/current is oscillated between anodizing and pore cleaning modes. Note that similar DC processing sequences can be used during an electro-coloring process or during a stand-alone pore cleaning process.

Figure 9:
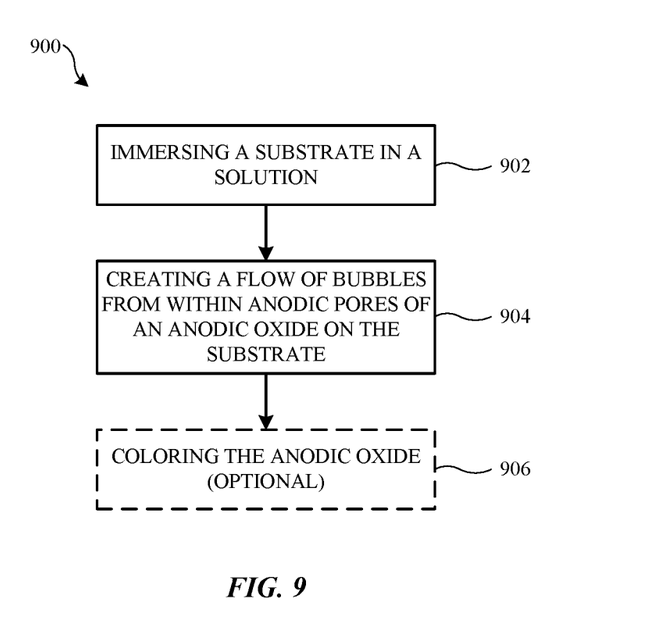
FIG. 9 shows a flowchart indicating a process for cleaning and anodic oxide coating.

FIG. 9 shows flowchart 900 indicating a process for cleaning an anodic oxide coating in accordance with some embodiments. At 902 a substrate is immersed in a solution. The solution can be an anodizing solution, where the pore cleaning process is performed during an anodizing process. The solution can be an electrodepositing solution, wherein the pore cleaning process is performed during a metal deposition process. The solution can be a solution dedicated to a pore cleaning operation.

At 904, a flow of bubbles is created from within pores of an anodic oxide on the substrate. If an anodizing process, the flow of bubbles can be created before, during or after anodic oxide film growth. If a metal electrodepositing process, the flow of bubbles can be created before, during or after depositing of metal within the pores. If the pore cleaning process is performed separately, the pore cleaning process can be performed before or after anodizing or metal electrodepositing processes. The bubbles can be created from hydrogen or oxygen gas that is generated from within the pores, depending on whether the pore cleaning process involves cathodic polarization or high potential anodizing. In some cases, ultrasonic agitation or low-pressure cycling generates the bubbles. The flow of bubbles forces contaminants out of the pores and into the solution.

At 906, the anodic oxide coating is optionally colored using a colorant. The coloring process can include immersing the anodized substrate in a heated solution containing an organic and/or inorganic dye for a period of time sufficient for the organic and/or inorganic dye to seep within pores of the anodic oxide coating, and adsorb onto the surface of the pore walls. Additionally or alternatively, the anodized substrate can be subjected to a metal electrodepositing process where a metal colorant is electrochemically driven into the pores. Since the pores have been cleaned of contaminants, the colorant can be evenly accepted throughout the anodic oxide coating, resulting in a uniformly and cosmetically appealing colored anodic oxide coating. After coloring, the anodic oxide coating can be optionally sealed using a sealing process to close the pores and lock in the colorant.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A method of cleaning an anodic oxide coating having pores, the anodic oxide coating overlaying an enclosure for a portable electronic device, wherein the enclosure includes a metal section that is separated from a non-metal section by a gap that contains contaminants, and wherein the metal section has a first coefficient of thermal expansion and the non-metal section has a second coefficient of thermal expansion that is different than the first coefficient of thermal expansion, the method comprising:
    forming the anodic oxide coating by exposing the metal section to an anodizing solution at a temperature that, due to the difference in the first and second coefficients of thermal expansion, causes the gap to enlarge such that the contaminants diffuse from the enlarged gap into at least some of the pores; and
    subsequent to forming the anodic oxide coating, exposing the anodic oxide coating to an electrolytic cleaning solution concurrently with subjecting the anodic oxide coating to alternating polarization cycles, thereby generating a flow of bubbles from within the pores having the contaminants such that the flow of bubbles forcefully expel the contaminants from the pores.

2. The method of claim 1, wherein generating the flow of bubbles comprises generating gas at pore terminuses of the pores.

3. The method of claim 2, wherein the gas is hydrogen that is generated by cathodic polarization.

4. The method of claim 3, wherein the hydrogen is generated from hydrolysis of water from the electrolytic cleaning solution.

5. The method of claim 3, wherein the cathodic polarization is imposed as part of forcefully expelling the contaminants from the pores.

6. The method of claim 1, wherein the contaminants that are included in the gap are remnants of a machining process.

7. The method of claim 2, wherein the gas is oxygen generated by applying a sufficiently high anodic potential to the enclosure to generate the flow of bubbles from within the pores of the anodic oxide coating.

8. The method of claim 1, wherein the flow of bubbles forces the contaminants away from an exterior surface of the anodic oxide coating.

9. A method of cleaning an anodic oxide coating of an enclosure of an electronic device, wherein the enclosure includes a metal section that is separated from a non-metal section by a gap, and the gap includes contaminants that are remnants of a machining process, the method comprising:
forming the anodic oxide coating over the metal section by exposing the metal section to an anodizing solution, wherein a temperature of the anodizing solution causes the gap between the metal section and the non-metal section to enlarge, thereby causing the contaminants to diffuse from the enlarged gap into pores of the anodic oxide coating;
exposing the anodic oxide coating to an electrolytic cleaning solution; and
during the exposing of the anodic oxide coating to the electrolytic cleaning solution:
subjecting the anodic oxide coating to alternating anodic and cathodic polarization cycles, thereby generating a flow of bubbles from within the pores of the anodic oxide coating having the contaminants to forcefully expel the contaminants from the pores.

10. The method of claim 9, further comprising:
incorporating a colorant within the pores of the anodic oxide coating, wherein the anodic oxide coating is cleaned prior to incorporating the colorant such that a region of the anodic oxide coating adjacent to the non-metal section uniformly uptakes the colorant.

11. The method of claim 9, wherein the metal section and the non-metal section are formed from different materials having different coefficients of thermal expansion.

12. The method of claim 9, wherein generating the flow of bubbles comprises generating hydrogen gas within the anodic oxide coating by cathodically polarizing the metal section.

13. A method of forming and cleaning an anodic oxide coating of an enclosure for a portable electronic device, wherein the enclosure includes a metal section that is separated from a non-metal section by a gap that includes contaminants, the method comprising:
forming the anodic oxide coating that overlays the metal section by exposing the enclosure to an anodic polarization cycle, wherein the anodic polarization cycle is sufficient to cause the gap between the metal section and the non-metal section to expand, thereby causing diffusion of the contaminants from the expanded gap into pores of the anodic oxide coating; and
forcefully expelling the contaminants from the pores of the anodic oxide coating by exposing the enclosure to a cathodic polarization cycle, wherein during the cathodic polarization cycle, hydrogen gas is generated from within the pores that forcefully expels the contaminants from within the pores.

14. The method of claim 13, wherein the metal section and the non-metal section are formed from different materials having different coefficients of thermal expansion.

15. The method of claim 14, wherein the anodic and cathodic polarization cycles are applied to the enclosure as an alternating current.

16. The method of claim 14, wherein the contaminants that are included in the gap are remnants of a machining process.

17. The method of claim 15, wherein the alternating current has a frequency of about 50 Hz.

18. The method of claim 15, subsequent to applying the alternating current to the enclosure, the method further comprises:
removing the enclosure from an anodizing electrolyte; and
coloring the anodic oxide coating.

* * * * *